Patented Nov. 2, 1926.

1,605,420

UNITED STATES PATENT OFFICE.

ARTHUR ERNEST ACKERS, OF HOMEBUSH, NEAR SYDNEY, AUSTRALIA.

MANUFACTURE OF ICING SUGAR.

No Drawing. Application filed February 11, 1926, Serial No. 87,692, and in Australia October 3, 1924.

This invention relates to improvements in the manufacture of icing sugar and is directed to a process for obtaining this object and whereby the resultant product is of maximum utility.

The process or processes hitherto employed for the manufacture of icing sugar has, or have, been defective for the reason that when the icing sugar is bagged, or packed in containers, or stored in bulk, it has solidified or changed into rock form, in which condition it is unsuitable for use, necessitating the user pulverizing the mass but which invariably does not attain the pulverulent condition required for effective use and further after such conditions occur it is impossible for the sugar to return to its natural state.

In the process of manufacture of icing sugar the definite step employed consists in passing sugar through a pulverizing mill the resultant pulverulent being what is known as icing sugar, which is discharged from the mill into a bin from which it is packed or bagged.

During the treatment in the mill, heat caused by friction is generated in the sugar, which in this condition loses its natural state, and when packed or bagged, an immediate deleterious action commences causing the particles to cling together in rock formation, and the sugar thus loses its utility, it being a definite fact that once the sugar reaches this condition it is not possible to bring it back to its natural useful state.

This invention has been devised in order to overcome this defect and to produce an icing sugar which not only remains in its natural useful state, but which retains its powdered condition for an indefinite length of time.

The basic principle underlying this invention consists in placing the heated powdered sugar from the mill in a cool place and subjecting it to the action of the atmosphere until all the heat therein generated by friction in the mill has been removed, thus returning the icing sugar to its natural state which when packed or bagged will keep for an indefinite period.

This principle may be carried into effect by the use of a heat extractor positioned between the mill and the bagging or packing operation.

The manner of carrying this principle into practical effect consists in treating the sugar after it has been withdrawn from the mill to the action of the atmosphere in a cool place and after the artificial heat therein, caused by friction in passing through the mill, has been entirely removed, packing and bagging the material which being returned to its natural state remains in that state and utility for a period sufficient for all forms of usages.

This cooling may be effected for small output by placing the pulverized sugar from the mill in substantially shallow pans in a cool place and subjecting the same to the action of the atmosphere until all the heat in the icing sugar is removed when the sugar returns to its normal and natural condition, and thus allows the same to be packed for use with a certainty of remaining in that condition for a considerable period without deteriorating.

As the material from the mill is thus subjected to the atmosphere for the purpose of removing the heat therein it will be obvious that no definite period can be given to cover the withdrawal of the heat from the material from the mill as it depends to a great extent on the particular climatic condition.

I have found in practice, however, that pans carrying a three inch depth of material take as long as five days under the atmospheric cooling to effectively reduce the heat in the pulverulent from the mill.

In large outputs it is preferred that automatic and continuous conveying means be employed between the mill and the bagging or packing platform and during this step the crushed sugar is subjected to cooling by atmosphere or any suitable form of heat extractor.

After cooling the icing sugar may be reconditioned or dressed if required by sieving or other means to ensure a powdered condition.

It will be obvious that any suitable form of heat extractor may be employed for cooling the mill pulverulent or crushed sugar which may be employed between the crushing step and the final bagging of the icing sugar, or alternatively a continuous sugar receiving and cooling mechanism from the mill to the bagging of the icing sugar may be used.

I desire it to be understood that the icing sugar may have the heat withdrawn by placing the mill pulverulent in specially constructed cooling chambers with or without artificial or mechanical means for circulating the atmosphere therein or over the material, or the air may first be subjected to drying; or the crushed sugar may be passed adjacent to or over jackets with a water circulating system and mechanical agitating means used on the material in the cooling stage without departing from the spirit and scope of the invention.

What I claim as my invention and desire to secure by Letters Patent is:—

In the manufacture of icing (pulverulent) sugar, in combination with the process steps of pulverizing, and packaging the sugar, an intermediate step comprising, cooling the pulverulent sugar, while unpacked, to dissipate the heat acquired by it through the friction incident to pulverizing.

Signed at Sydney, New South Wales, Australia, this seventh day of January, 1926.

ARTHUR ERNEST ACKERS